United States Patent [19]

Dennison et al.

[11] Patent Number: 4,722,666
[45] Date of Patent: Feb. 2, 1988

[54] NOSE COWL MOUNTED OIL LUBRICATING AND COOLING SYSTEM

[75] Inventors: William T. Dennison, Vernon; Robert F. Brodell, Marlborough, both of Conn.

[73] Assignee: United Technologies Corporation, Hartford, Conn.

[21] Appl. No.: 67,340

[22] Filed: Jun. 29, 1987

[51] Int. Cl.⁴ ............................................. B64C 11/14
[52] U.S. Cl. ......................................... 416/94; 416/174
[58] Field of Search .................. 416/94, 146 A, 93 R, 416/170, 174; 60/39.08; 184/6.11, 104.3; 415/176

[56] References Cited

U.S. PATENT DOCUMENTS

| | | | |
|---|---|---|---|
| 2,318,233 | 5/1943 | Keller | 416/94 |
| 2,435,990 | 2/1948 | Weiler | 184/6.11 X |
| 2,604,188 | 7/1952 | Marchant | 184/6.11 |
| 2,761,281 | 9/1956 | Armer | 60/39.08 |
| 2,779,423 | 1/1957 | Cushman | 416/94 |
| 2,848,054 | 8/1958 | Pearl | 416/94 |
| 2,891,627 | 6/1959 | Ditmer et al. | 416/94 |
| 2,940,258 | 6/1960 | Lombard et al. | 184/6.11 |
| 2,984,975 | 5/1961 | Rodgers et al. | 60/39.08 |
| 3,045,762 | 7/1962 | Gaubis et al. | 416/94 |
| 3,703,081 | 11/1972 | Krebs et al. | 60/39.08 |
| 3,722,212 | 3/1973 | Stein | 60/39.08 |
| 3,810,528 | 5/1974 | Morley et al. | 60/39.08 |
| 3,834,157 | 9/1974 | Hoffmann | 60/39.08 |
| 3,903,690 | 9/1975 | Jones | 184/6.11 |
| 3,942,911 | 3/1976 | Keenan et al. | 416/174 X |
| 4,041,697 | 8/1977 | Coffinberry et al. | 60/39.08 |
| 4,151,710 | 5/1979 | Griffin et al. | 60/39.08 |
| 4,354,345 | 10/1982 | Dreisbach, Jr. et al. | 60/39.08 |
| 4,497,172 | 2/1985 | Smith | 60/39.08 |
| 4,511,016 | 4/1985 | Doell | 60/39.08 |
| 4,693,672 | 9/1987 | Carvalho | 416/174 |

FOREIGN PATENT DOCUMENTS 172976 10/1960 Sweden .............................. 60/39.08

Primary Examiner—Everette A. Powell, Jr.
Attorney, Agent, or Firm—Charles A. Warren

[57] ABSTRACT

An oil lubricating and cooling system is positioned in the engine cowl and includes a heat exchanger, a compressor for delivering air from air inlets in the surface of the cowl through the heat exchanger and hence to air outlets also in the cowl surface and oil pumps also located within the cowl for circulating oil from the sump in the cowl to the heat exchanger to the reduction gear within the cowl that serve to drive the fan also supported within the cowl and having the blades extending outwardly therefrom. The reduction gear, compressor and pumps are all driven from the engine shaft, the end of which is located in the cowl.

9 Claims, 1 Drawing Figure

U.S. Patent     Feb. 2, 1988     4,722,666
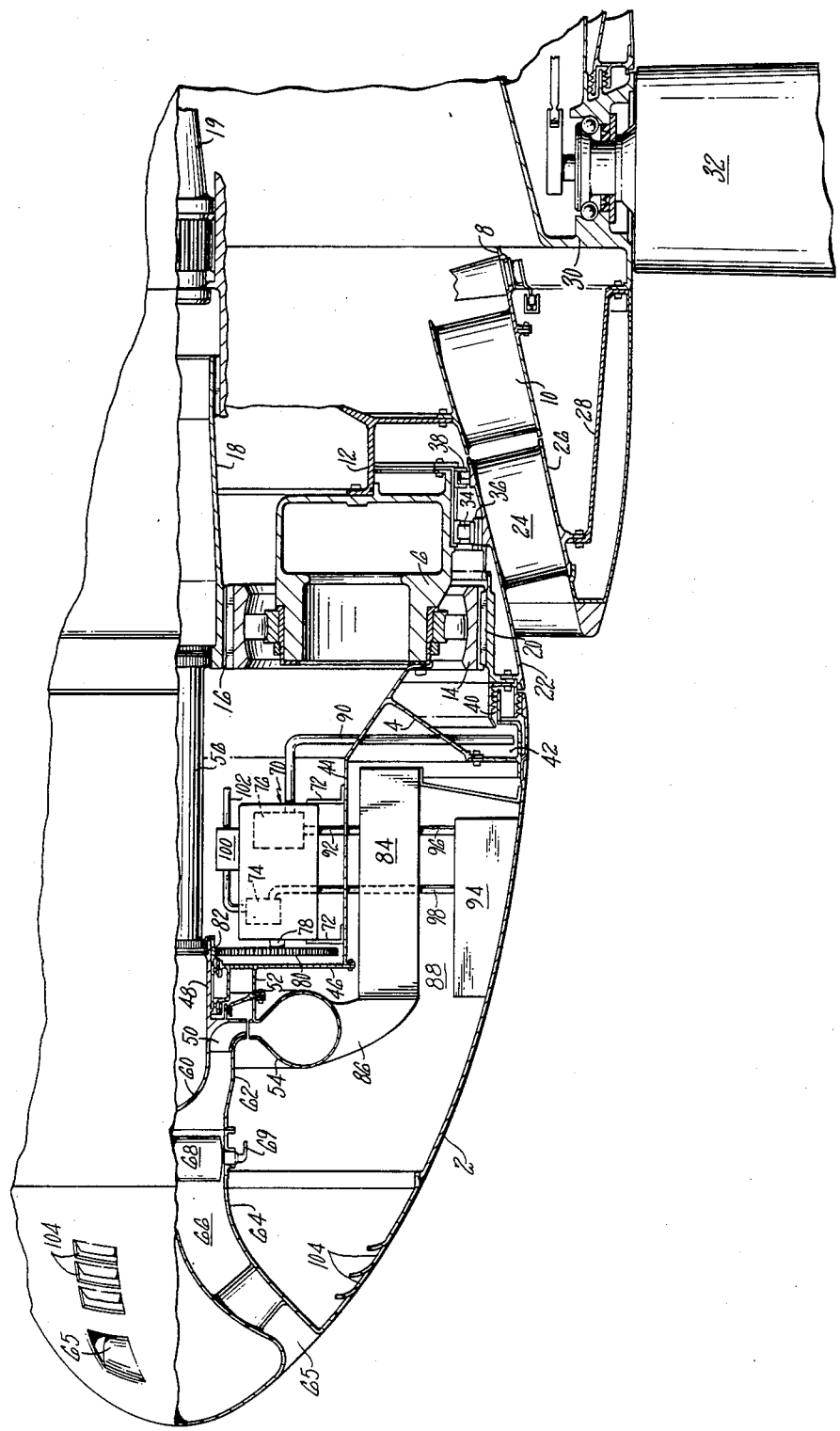

NOSE COWL MOUNTED OIL LUBRICATING AND COOLING SYSTEM

DESCRIPTION

1. Technical Field

This invention relates to a lubricating system for a fan reduction gear box located in the nose of the cowl and to a cooling system for the lubricant which is also located in the cowl to provide a simplified cooling system and a simplification of the routing of lubricant and coolant lines.

2. Background Art

When the oil pumps and coolers are mounted external to the compressor case there is a need for oil lines passing across the gas path through the gas turbine and the result is a complexity in the overall lubricating and cooling system. Furthermore the cooling air must then be taken either from pressurized sources within the engine or from the aircraft and directed to the heat exchanger. This usually necessitates large air ducts with accompanying weight and losses.

A problem also exists in obtaining cooling flow at static conditions before ram air is available; a pump to raise the pressure difference is required.

When the cooling air is taken, for example, from the fan air duct downstream of the fan, the temperature rise across the fan decreases the cooling potential of the cooling air and thus a large heat exchanger and large cooling air ducts are needed in order to supply adequate cooling air for the purpose. However, if the cooling air could be taken into the system and moved through the heat exchanger by an air pump that did not signifirantly raise the temperature of the air, the cooling effect is much greater, the airflow could be much less and the size of the heat exchanger could be much smaller with lower performance losses. Thus the location of the heat exchanger, the lubricant passages and the cooling air circulation within the cowl would also result in a substantial saving in the weight of the system.

DISCLOSURE OF INVENTION

According to the invention the gear box oiling system is located in the inlet nose cowl with the gear box. The cooling system for the oil is also located in the nose cowl and the inlet and discharge for the cooling air are both in the wall surfaces of the cowl with an air pump driven by the engine also located in the cowl within the air ducting to establish and maintain a cooling flow of air under maximum cooling conditions.

An added feature is an air control to reduce the air flow when heat exchanger cooling requirements are reduced.

Another feature is the location of the air inlet near the tip of the cowl so that the ram effect can be utilized to improve the cooling air flow and the air discharge is also located so as to pass through a series of cascades on the outer surface of the cowl for de-icing purposes.

A particular feature is a reduction in the size of the heat exchanger and all the ducting by reason of having the cooling air entering the heat exchanger at a much lower temperature than the oil to be cooled so that a much smaller quantity of cooling air is needed.

Other features and advantages of the invention will be apparent from the specification and claims and from the accompanying drawings which illustrate an embodiment of the invention.

BRIEF DESCRIPTION OF THE DRAWING

The single FIGURE is a longitudinal sectional view through the nose cone or cowl in which the invention is positioned.

BEST MODE FOR CARRYING OUT THE INVENTION

Referring to the drawing, the cowl 2 or nose cone is supported on a fixed structure 4 mounted on the forward side of the cage 6 of the gear box. Downstream of the gear box the structure is supported from the compressor housing 8 through struts 10 and support structure 12 secured to the inner ends of the struts and to the cage.

Cage 6 supports the intermediate gears 14 of a reduction gear system that includes the sun gear 16 driven from a sleeve 18 connected to one of the turbine shafts 19. The intermediate gears are surrounded by a ring gear 20 secured to the inner sleeve 22 for an assembly of vanes 24. An outer sleeve 26 on the outer ends of the vanes supports a rotating housing 28 that at its rearward end is connected to a fan disk 30 for driving it. The disk 30 supports a row of fan blades 32.

The vane assembly is supported at its forward end on a bearing 34 on the cage 6, the outer race 36 of the bearing forming a part of the vane assembly. A seal structure 38 downstream of the bearing 34 prevents leakage of oil at this point and other seals 40 between the forward end of the inner sleeve 22 and the trailing edge of cowl 2 prevents leakage at this point. The arrangement of the support structure 4 is such as to form a chamber 42 forward of the ring gear 20 in which the oil after cooling the reduction gear may be collected for re-use.

The support structure 4 has a forwardly extending sleeve 44 having an integral disk 46 at its forward end to support the shaft 48 for the centrifugal pump 50 which pressurizes the cooling air. This disk 46 also has a forwardly extending sleeve 52 to support the casing 54 for the impeller 50 in which the compressed air from the impeller is collected to be supplied to the heat exchanger. It is obvious that, where benificial, this system could also be arranged with the pump after the heat exchanger, acting as a suction device.

A sleeve 56 splined at its rearwend end to the sleeve 18 and at its forward end to the impeller shaft 48 drives the impeller. The latter has a forwardly extending hub 60 forming the inner wall for the pump inlet. An extension sleeve 62 extending forwardly from the compressor casing forms the outer wall for the inlet. This sleeve 62 is secured to the downstream end of an air inlet 64 that consists of several inlet ducts 65 open to the outer wall of the cowl 2 near its forward end and extending inwardly to define an annular passage 66 communicating with the inlet to the pump and heat exchange system. A controlling air valve could be used with the system, for example, within the passage 66 is a valve 68 having an external crank arm 69 by which to adjust the position of the valve to control the flow of air to a limited extent to the pump. The mechanism for controlling this valve is not a part of the present invention and need not be described. Other methods of controlling the airflow such as unclutching the pumps are also invisional.

An oil pump 70 is mounted on the structure 4 rearwardly of the disk 46 as by webs 72. The pump is a multi-stage pump in that it has a pressure pump 74 and a scavenge pump 76 both driven from a common shaft 78 carrying a gear 80 meshing with a gear 82 on the shaft 48.

Also mounted on the cowl is the heat exchanger 84 which receives air from the casings 54 through a connecting duct 86. From the heat exchanger the air discharges into a chamber 88 that surrounds the heat exchanger.

Oil from the sump 42 is drawn through pipe 90 to the scavenge pump 76 and from this pump through a pipe 92 to the heat exchanger. Oil from the heat exchanger is piped to an oil tank 94 through a duct 96. The tank is preferably supported on the cowl 2 for convenience close to the heat exchanger. From the tank oil enters the pressure pump 74 through a duct 98 from which it is discharged through an oil filter 100 to a discharge duct 102 to the several places requiring lubrication and/or cooling such as the reduction gear. An important feature is that all the oil system is within an area that requires very little ducting and does not necessitate the passage of oil across the gas flow through the turbine.

As the oil is cooled the cooling air from the compressor passes through the heat exchanger and is discharged into the chamber 88 from which it passes through a series of cascades 104 to flow onto and over the outer surface of the cowl and could be used for de-icing the cowl in this area. With this arrangement a minimum of ducting is necessitated for ducting the complete airflow into and out of the cowl and through the heat exchanger.

It should be understood that the system can be design for maximum cooling at required times in the engine operation when cooling requirements are a maximum.

At other times a flow control device could be used such as by closing the valve 68 to a greater or lesser degree, the flow to the air pump may be significantly reduced more or less so that only the required amount of air is pumped. Obviously the valve may be positioned as a function of the temperature of the oil leaving the heat exchanger thereby assuring the maximum amount of cooling for the oil. Although the valve may be controlled by oil temperature it is obvious that other control means may be provided. The important criteria are that the pumping requirements be maintained at a minimum that will still assure adequate cooling of the oil.

Because of this arrangement the temperature of the air reaching the heat exchanger is much lower than it would be if bled from the engine compressor, and thus there is a greater temperature difference available for cooling the oil. In this way a lesser amount of air is needed and the ducts can all be relatively small. The heat exchanger may also be smaller than would otherwise be needed. With the entire cooling system and the lubrication system both enclosed with the nose cone and the inner wall of the air inlet system, the extent of ducting required is reduced to a minimum with a resulting weight reduction and simplification of the system.

It should be understood that the invention is not limited to the particular embodiments shown and described herein, but that various changes and modifications may be made without departing from the spirit and scope of this novel concept as defined by the following claims.

We claim:

1. An oil lubricating and cooling system including: an engine cowl,
    a reduction gear in the cowl,
    a fan having a support ring mounted for rotation in the cowl and driven by the reduction gear and having fan blades thereon,
    an air pump within the cowl, the pump having inlet ducts connected to air inlet openings on the outer surface of the cowl and outlet openings in the cowl surface,
    a heat exchanger downstream of the pump and connected to the outer openings for the discharge of air therefrom,
    an oil sump within said cowl,
    an oil pump mounted within said cowl for pumping oil from said sump to said heat exchanger and from the heat exchanger to the reduction gear for lubricating and cooling it, and
    drive means for said air pump, oil pump and reduction gear.

2. A system as in claim 1 in which the cowl has therein the end of an engine shaft and the drive means are connected to said engine shaft.

3. A system as in claim 1 in which the ducting has a means for controlling the flow of air through the compressor.

4. A system as in claim 1 in which the oil pump is two commonly driven pumps, one a pump for oil from the sump to the heat exchanger and the other from the heat exchanger to the reduction gear.

5. A system as in claim 1 in which the air inlets are located close to the forward end of the surface of the cowl and the air outlets are located downstream of the inlets.

6. A system as in claim 1 in which the system also includes an oil filter and an oil tank both mounted within the cowl.

7. An oil lubricating and cooling system including:
    an engine cowl or nose cone at the forward end of the engine,
    a reduction gear located in the cowl,
    a fan support ring mounted within the cowl and connected to the reduction gear, said support ring being journaled for rotation within the cowl and having a row of fan blades thereon projecting outwardly from the surface of the cowl,
    an air compressor in the cowl having an impeller driven by the engine shaft and having inlet ducts connected to air inlet openings in the surface of the cowl and outlet ducts connected to discharge openings also in the surface of the cowl,
    a heat exchanger within the cowl,
    an oil pump for circulating oil within said cowl, said pump being arranged to deliver oil to the heat exchanger and from the heat exchanger to the reduction gear,
    an oil sump in which oil from the reduction gear is collected and from which the pumps draw oil to deliver to the heat exchanger, and
    drive means for said compressor and pumps between said engine shaft and said compressor and pump.

8. A system as in claim 7 in which there is a valve provided downstream of the compressor impeller to control the flow of air to the compressor during operation.

9. A system as in claim 7 in which the oil pump is two commonly driven pumps, one being a pump for oil from the sump to the heat exchanger and the other to pump oil from the heat exchanger to the reduction gear.

* * * * *